United States Patent
Ahn et al.

(10) Patent No.: US 7,651,752 B2
(45) Date of Patent: *Jan. 26, 2010

(54) SUPER RESOLUTION OPTICAL DISC

(75) Inventors: Kun Ho Ahn, Seoul (KR); Keum Cheol Kwak, Seoul (KR); Jin Hong Kim, Yongin-si (KR)

(73) Assignee: LG Electronics Inc., Seoul (KR)

(*) Notice: Subject to any disclaimer, the term of this patent is extended or adjusted under 35 U.S.C. 154(b) by 615 days.

This patent is subject to a terminal disclaimer.

(21) Appl. No.: 11/132,215

(22) Filed: May 19, 2005

(65) Prior Publication Data

US 2005/0259564 A1    Nov. 24, 2005

(30) Foreign Application Priority Data

May 21, 2004    (KR) .................... 10-2004-0036235

(51) Int. Cl.
    *B32B 3/02*    (2006.01)
(52) U.S. Cl. ............... 428/64.1; 428/64.4; 428/64.5; 430/270.13
(58) Field of Classification Search ............... 428/64.1, 428/64.4, 64.5; 430/270.12, 270.13
See application file for complete search history.

(56) References Cited

U.S. PATENT DOCUMENTS

| 6,661,745 | B1 | 12/2003 | Tominaga et al. |
| 6,693,854 | B2 | 2/2004 | Shimazaki et al. |
| 6,896,946 | B2* | 5/2005 | Chen .................... 428/64.1 |
| 6,961,300 | B2* | 11/2005 | Cheong et al. ......... 369/275.1 |
| 7,232,598 | B2* | 6/2007 | Ahn et al. ................ 428/64.4 |
| 7,348,124 | B2* | 3/2008 | Hwang et al. ......... 430/270.12 |
| 2003/0228462 | A1* | 12/2003 | Chen .................... 428/336 |
| 2005/0259563 | A1* | 11/2005 | Ahn et al. ................ 369/283 |

FOREIGN PATENT DOCUMENTS

WO    WO-03/098620 A1    11/2003

* cited by examiner

*Primary Examiner*—Elizabeth Mulvaney
(74) *Attorney, Agent, or Firm*—Birch, Stewart, Kolasch & Birch, LLP

(57) ABSTRACT

Disclosed herein is a super resolution optical disc. The super resolution optical disc comprises dielectric layers, and a mask layer formed between the dielectric layers, in which the mask layer is constructed as a complex mask layer comprising a metallic oxide ($MO_x$) or metallic nitride ($MN_y$), and a metallic thin film formed thereon. A size of the cavities and an amount of metallic particles in cavities created by illumination of recording laser can be controlled to increase a level of a reproduction signal for recording marks and to enhance the quality of the reproduction signal.

9 Claims, 4 Drawing Sheets

Construction of conventional super resolution optical disc

Super resolution optical disc transmission electron micrograph

Super resolution optical disc transmission electron micrograph

Metallic thin film formed on metallic compound layer

Metallic thin film formed under metallic compound layer

Metallic thin film formed on upper and lower surfaces of metallic compound layer

- 202
- 22 ZnS-SiO$_2$
- 30 Metal
- 23 MO$_x$ (or MN$_y$)
- 31 Metal
- 24 ZnS-SiO$_2$

Metallic thin film formed between metallic compound layers

- 203
- 22 ZnS-SiO$_2$
- 23 MO$_x$ (or MN$_y$)
- 30 Metal
- 33 MO$_x$ (or MN$_y$)
- 24 ZnS-SiO$_2$

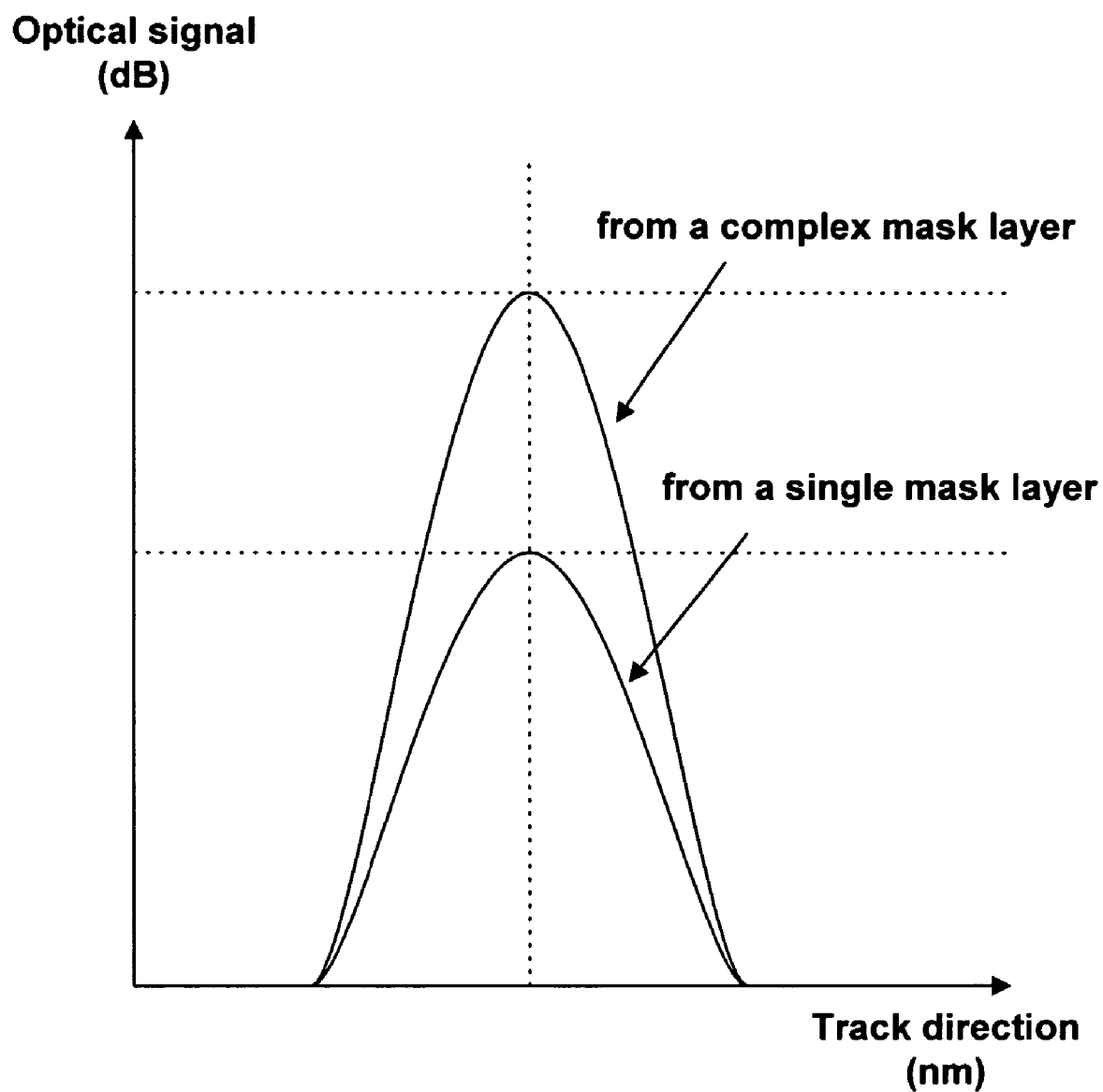

SUPER RESOLUTION OPTICAL DISC

BACKGROUND OF THE INVENTION

1. Field of the Invention

The present invention relates to a super resolution optical disc, which has a complex mask layer formed therein for enhancing signal quality of the optical disc.

2. Description of the Related Art

Generally, currently available optical discs have a storage capacity of about 4.7 GB (gigabytes) in the DVD (Digital Versatile Disc) standard using red laser or of about 25 GB in the BD (Blue-ray Disc) standard using blue laser, which has been commercialized recently. However, in order to record and reproduce a huge amount of information for applications, such as high definition TV or E-medicine, there is a need to provide an information storage technology with a higher density.

For instance, in order to record a data stream of high definition digital video, recently available on the market, there is a need to provide a storage medium, which has a storage capacity of 20 GB or more and is able to record the data at a speed of 25 Mbps or more.

Moreover, it is anticipated that technology capable of recording 100 GB or more of information/CD-size media will be required after 2005 and technology capable of recording terabytes of data on CD-size media will be required after 2010. For this purpose, it is necessary to record the information at a high density and a high speed.

In such various multimedia environments, research and development of various types of multi-functional information storage technology has been conducted.

Among the information storage technologies, optical recording technology is most spotlighted and widely used due to its merits. Specifically, an optical recording medium is capable of being easily detached from its drives, and storing a large amount of information data. As a necessary function in the multimedia environment, random access of data on the optical recording medium is allowed in the optical recording technology. Further, high data integrity and low manufacturing costs are provided.

As a method for increasing the recording density of the optical recording medium, a method of decreasing the size of the laser beam incident on the recording medium is used. As developed at present, the reduction of the size of the laser beam incident on the recording medium is accomplished by decreasing the wavelength of the laser or increasing a numerical aperture of an objective lens. The size of bits recorded on the medium is in proportion to the wavelength of the laser, and is in inverse proportion to a numerical aperture (NA) of an objective lens.

However, currently, methods for increasing recording density by using a short wavelength, such as a blue laser (405 nm), together with a high numerical aperture (NA=0.85), have substantially arrived at the theoretical limits of optics, so there is a need to develop a new technology for realizing a higher storage capacity.

Accordingly, as a plan for developing an optical memory, which is compatible with the existing CD or DVD and is also capable of storing information with a density several hundreds times higher than the storage capacity of the existing CD, that is, 650 MB, research into an optical disc using a super resolution phenomenon, that is a super resolution optical disc, has been conducted.

It is expected that the super resolution technology can remarkably reduce the size of a recording mark while using a conventional laser optical pickup system, thereby increasing the recording density. The super resolution technology uses a near-field effect by a focused laser beam.

Among the super resolution technologies, according to a WORM (Write Once Read Many)-type super resolution technology, recording marks are not formed on a crystal/non-crystal reversible phase transformation-type recording layer available for the DVD. Instead, an oxide thin film, such as $AgO_x$, $PtO_x$ and the like, of a mask layer in a recordable optical disc is decomposed by the laser beam, and cavities formed from the decomposition and nanosized metal particles precipitated in the mask layer form near-field while acting as scattering cores such that the cavities and particles act as a recording layer.

Here, dielectric thin films consisting of a $ZnS$—$SiO_2$ based component are formed at upper and lower portions of the oxide thin film of the mask layer, respectively, in consideration of optical, thermal, and mechanical properties of the oxide thin film. Further, as for a substrate, polycarbonate (PC) is mainly used, since PC is light, has good injection properties, and can increase carrier-to-noise ratio (CNR) due to a low birefringence when the laser is incident thereon.

FIG. 1 is a view illustrating the structure of a conventional super resolution optical disc. By irradiating the laser beam on the super resolution optical disc, the thermally decomposed masks are locally recorded in the thin film laminated on a groove or a land, and by irradiating a low power laser thereon, a signal caused by difference of reflection rate between the mark and the background (space), which is not formed with the marks, is detected.

At this time, a jitter value becomes an important standard for demonstrating a reproduction quality. The jitter value is an amount represented by a statistical variation of the values of time differences between a clock (PLL clock) generated from a reproduction signal and a border of each recording mark determined from the reproduction signal. Specifically, the jitter value is a value represented by a percentage of the standard deviation of the values of time differences between a leading edge of the mark and the PLL clock and between a trailing edge of the mark and the PLL clock, divided by 1T.

Although there are various causes influencing the jitter value and various aspects influencing the jitter value are not simple, especially, Inter-Symbol Interference (ISI) caused by the shape of the marks formed on the recording medium and by relation of marks and space between the marks plays a very important role in influencing the jitter value. That is, in a process for analyzing the signal read by a pickup part, the relation between the shape of the mark recorded on the recording medium and the space between the marks determines the quality of the reproduction signal. Accordingly, it is very important to provide a technology which can record the marks on the recording medium with a desired shape in order to reduce the jitter value by improving the quality of the reproduction signal.

According to research into the conventional super resolution optical disc using a single mask layer, as shown in FIG. 2, the mask layer, which is several nanometers thick [for example, PtOx (4 nm)], is expanded to have a thickness of ten times or more through the recording process, and continues to expand through the reproduction process after recording. An expanded portion is a Ge—Sb—Te or Ag—In—Sb—Te thin film layer, which is used as a recording layer in a typical phase transformation type optical disc. The expansion is attributed to the fact that the mask layer is decomposed by the focused laser beam and a phase transformation material having a low melting point is partially melted or decreased in viscosity, thereby causing the remaining mask layer to easily expand toward the decomposed portion thereof.

Further, as shown in FIG. 3, in case of a super resolution optical disc 101, which has a symmetrical structure of a dielectric layer (for example, ZnS—SiO$_2$) and a recording layer (for example, Ag—In—Sb—Te) at upper and lower portions of the mask layer (for example, PtO$_x$), each mark in the mask layer is expanded into an oval-shape.

Since the laser beam has a temperature variation corresponding to a Gaussian distribution at the cross section thereof, there is a considerable difference of volume expansion between the center of the recording marks and an outer periphery thereof, and the degree of volume expansion is gradually decreased toward the outer periphery of the recording marks.

Due to such a non-uniform expansion of the mask layer, the recording marks are not uniform, and the reflection rate differs between the center of the marks and the outer periphery thereof. Moreover, the border between the outer periphery of the marks and the space between the marks is poorly defined. Accordingly, there are problems in that the quality of the reproduction signal of the optical disc is lowered and in that integrity of reproduction performance cannot be secured.

Moreover, although there have been continuous efforts to increase the level of the reproduction signal for the super resolution optical disc using the metallic oxide or metallic nitride as described above, an effective solution to the problem described above has yet to be developed.

It has been known in the art that the marks recorded on the super resolution optical disc cause variation in the reflection rate of the super resolution optical disc due to influence of the nanosized metal particles, abrupt change in the refractive index of oxygen or nitride cavities, change in physical properties of a surrounding material caused by high temperature and high pressure, and the like.

Accordingly, in order to increase difference of reflection rates between the marks on the optical disc and a portion of the optical disc where the marks are not recorded, the super resolution optical disc must be manufactured in such a manner that, when the recording laser is irradiated thereto, the amount of the nanosized metal particles is increased, the size of the cavities formed in a direction of depth to which the laser is incident is increased, or the physical properties of the surrounding material are abruptly changed.

However, if the metallic nitride or the metallic oxide having a high metal content is employed for the typical super resolution optical disc, the amount of the nanosized metal particles created by the recording laser is relatively increased, whereas volume expansion caused by the thermal decomposition is lowered due to a relative decrease in oxygen or nitrogen content, so that the size of the resultant recording marks is decreased. As a result, the signals reproduced through the marks formed as described above are reduced in level since the size of the marks is reduced in the direction of depth, so that it cannot be expected to have an effect of increasing the level of the signal with an increase in the amount of the metal particles.

SUMMARY OF THE INVENTION

The present invention has been made to solve the above problems, and it is an object of the present invention to provide a super resolution optical disc, designed to increase the level of a reproduction signal for a recording mark while enhancing the quality of the reproduction signal.

In accordance with one aspect of the present invention, the above and other objects can be accomplished by the provision of a super resolution optical disc, comprising at least one mask layer, and at least one metallic thin film formed on at least one of upper and lower surfaces of the mask layer. The at least one mask layer may comprise a plurality of mask layers, and the at least one metallic thin film may be formed between the mask layers.

The at least one mask layer may comprise a metallic compound comprising one of oxygen and nitrogen, and when the mask layer is heated above a predetermined temperature, the mask layer may be thermally decomposed into nanosized metal particles and gas. A metallic component contained in the metallic compound and thermally decomposed therefrom may be the same as that of the metallic thin film, or different from that of the metallic thin film.

The metallic thin film may comprise a metallic material capable of being mechanically or chemically deposited.

The at least one mask layer and the metallic thin film may constitute a complex mask layer, and the super resolution optical disc may further comprise dielectric layers formed on upper and lower surfaces of the complex mask layer and consisting of at least one of ZnS—SiO$_2$, GeN and SiN$_x$.

The super resolution optical disc may further comprise at least one recording layer formed on one of upper and lower surfaces of the structure comprising, as one set, the dielectric layers and the complex mask layer between the dielectric layers and the at least one recording layer consists of at least one of Ge, Sb, Te, Ag, In, Sn, Zn, Pb, Bi, Ti, Se, S, Al, Ga, Cd and I acting as a phase transformation material.

BRIEF DESCRIPTION OF THE DRAWINGS

The foregoing and other objects and features of the present invention will be more clearly understood from the following detailed description taken in conjunction with the accompanying drawings, in which:

FIG. 8 is a graphical representation comparing optical performance of the super resolution optical discs having the complex mask layer formed therein according to the present invention with the optical performance of the conventional super resolution optical discs.

DETAILED DESCRIPTION OF PREFERRED EMBODIMENTS

Preferred embodiments will now be described in detail with reference to the accompanying drawings.

Figure 1:
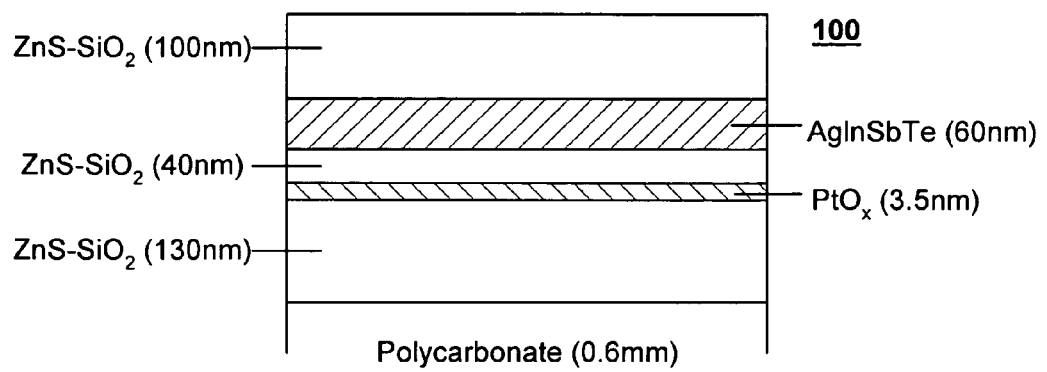
FIG. 1 is a view illustrating the structure of a conventional super resolution optical disc.
Figure 2:
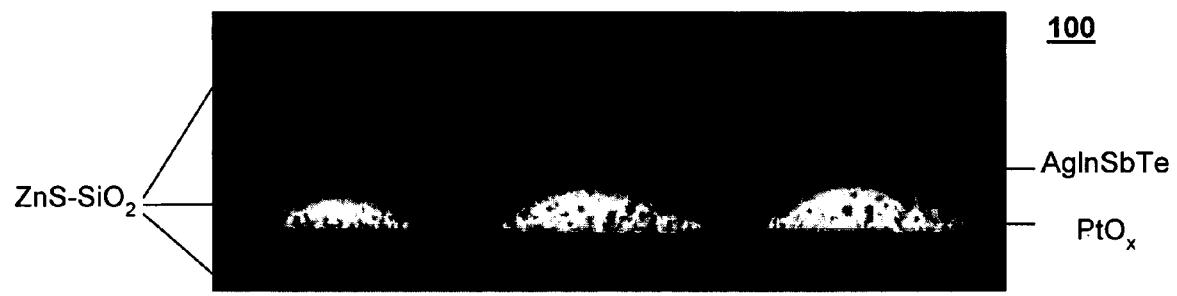
FIGS. 2 and 3 are micrographs of the conventional super resolution optical disc taken using a transmission electron microscope, respectively.
Figure 3:

As shown in FIGS. 1 to 3, a conventional super resolution optical disc employs a single mask layer consisting of a metallic oxide or nitride with a predetermined composition. Level and quality of a reproduction signal for recording marks created by thermal decomposition of the mask layer are varied depending on an outer peripheral shape of the marks, a thickness of the marks, an amount of nanosized metal particles contained in the marks, and the like.

For the recording marks having the same length, a composition ratio of oxygen or nitrogen to metal in the metallic oxide or nitride must be high, or a deposition thickness must be high in order to increase volume expansion depthwise by thermal decomposition. However, as the composition ratio of oxygen or nitrogen to metal in the metallic oxide or nitride is increased, the amount of nanosized metal particles is decreased. Moreover, when the composition ratio of oxygen or nitrogen to metal in the metallic oxide or nitride is lowered to increase the amount of the nanosized metal particles contained in the marks, the volume expansion of oxygen or nitrogen is lowered.

Thus, there is a limitation in increasing the level of the reproduction signal simply by optimization of a gaseous composition ratio of the metallic oxide or nitride in the super resolution optical disc employing the single mask layer.

According to the invention, a metallic thin film is deposited together with an oxide or nitride thin film in order to solve the problem as described above in such a manner of increasing the amount of the nanosized metal particles. This is attributed to the fact that, when the amount of the metal particles in the recording marks is increased, the optical performance of the total recording marks are enhanced together with abrupt variation of the optical performance around an outer periphery of the recording marks, thereby increasing the level of the reproduction signal while enhancing the quality of the reproduction signal.

According to the invention, the super resolution optical disc comprises dielectric layers (for example: $ZnS$—$SiO_2$), a mask layer of a metallic compound ($MO_x$ or $MN_y$) formed between the dielectric layers, and at least one metallic thin film formed on one of upper and lower surfaces of the mask layer. Herein, the metallic thin film and the mask layer of the metallic compound constitute a new mask layer, which is defined as a complex mask layer in the invention.

The metallic compound is a metallic oxide ($MO_x$) comprising oxygen ($O_x$) or a metallic nitride ($MN_y$) comprising nitride ($N_y$), and is decomposed into nanosized metal particles (M) and a gas ($O_2$ or $N_2$) when heated above a predetermined temperature. The metallic thin film may comprise a metallic material which can be mechanically or chemically deposited as the thin film.

Moreover, a metallic component (M) thermally decomposed from the metallic compound may be the same as that of the metallic thin film, or different from that of the metallic thin film. The dielectric layers formed on the upper and lower surfaces of the complex mask layer may comprise one of $ZnS$—$SiO_2$, GeN and $SiN_x$.

At least one recording layer may be further formed on at least one of upper and lower surfaces of the structure comprising, as one set, the dielectric layers and the complex mask layer between the dielectric layers, and may comprise at least one of Ge, Sb, Te, Ag, In, Sn, Zn, Pb, Bi, Ti, Se, S, Al, Ga, Cd and I which are a phase transformation material.

Figure 4:
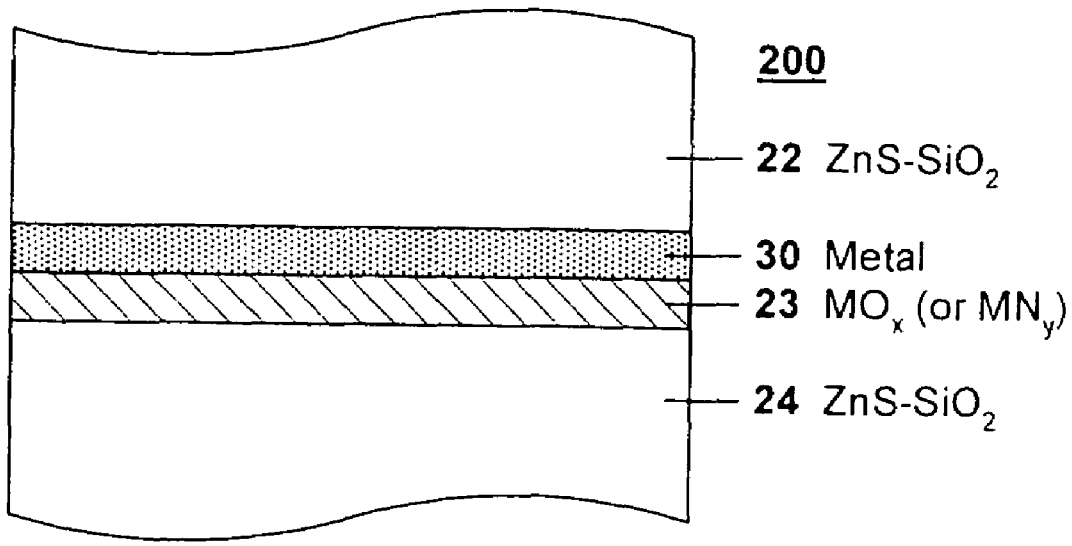
FIG. 4 is a view illustrating the structure of a super resolution optical disc having a complex mask layer formed therein according to a first embodiment of the present invention.

FIG. 4 is a view illustrating a portion of a super resolution optical disc having a complex mask layer formed therein according to a first embodiment of the invention. The super resolution optical disc 200 comprises a complex mask layer between dielectric layers 22 and 24, in which the complex mask layer comprises a metallic compound layer 23, and a metallic thin film 30 formed on the metallic compound layer 23.

Figure 5:
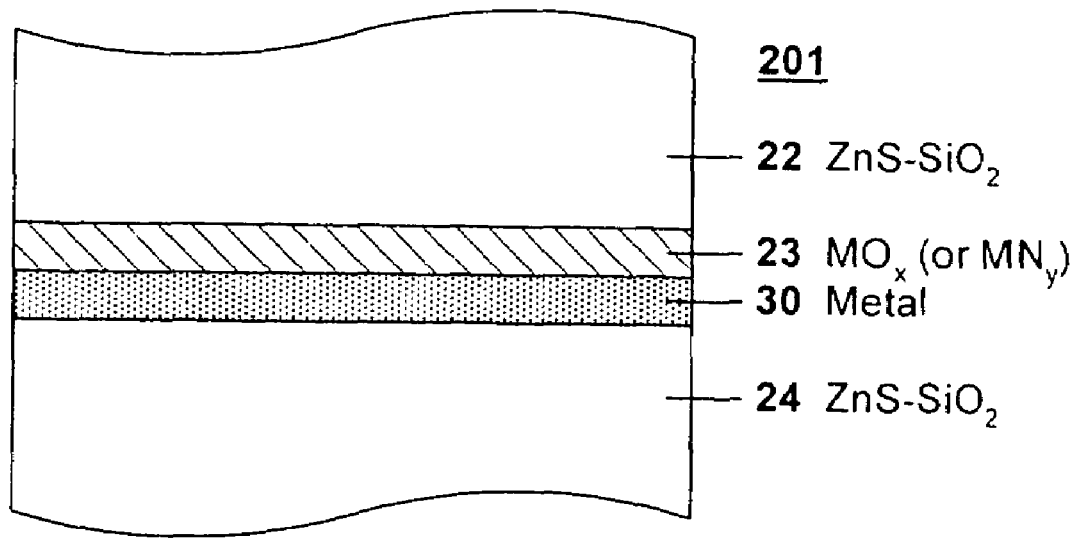
FIG. 5 is a view illustrating the structure of a super resolution optical disc having a complex mask layer formed therein according to a second embodiment of the present invention.

Referring to FIG. 5, a super resolution optical disc 201 according to a second embodiment of the invention comprises a complex mask layer between dielectric layers 22 and 24, in which the complex mask layer comprises a metallic compound layer 23, and a metallic thin film 30 formed under the metallic compound layer 23.

Figure 6:
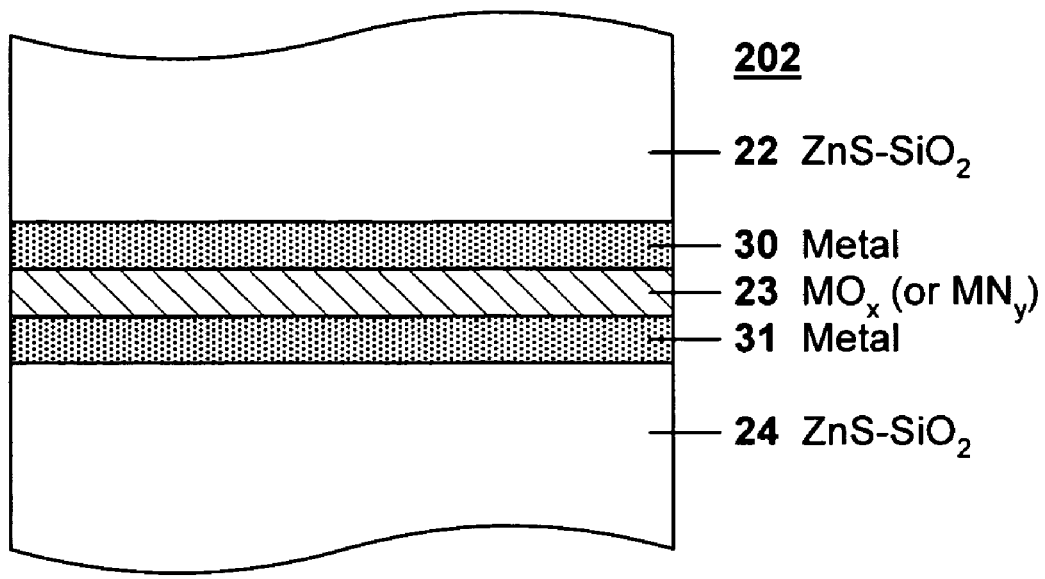
FIG. 6 is a view illustrating the structure of a super resolution optical disc having a complex mask layer formed therein according to a third embodiment of the present invention.

Referring to FIG. 6, a super resolution optical disc 202 according to a third embodiment of the invention comprises a complex mask layer between dielectric layers 22 and 24, in which the complex mask layer comprises a metallic compound layer 23, and first and second metallic thin films 30 and 31 formed on upper and lower surfaces of the metallic compound layer 23, respectively.

Figure 7:
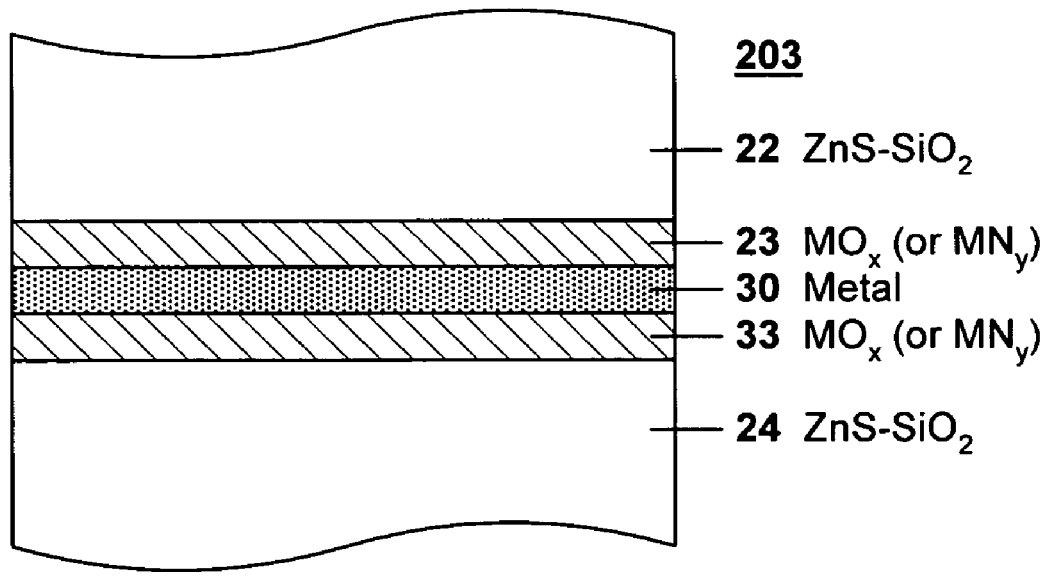
FIG. 7 is a view illustrating the structure of a super resolution optical disc having a complex mask layer formed therein according to a fourth embodiment of the present invention.

Referring to FIG. 7, a super resolution optical disc 203 according to a fourth embodiment of the invention comprises a complex mask layer between dielectric layers 22 and 24, in which the complex mask layer comprises first and second metallic compound layers 23 and 33, and a metallic thin film 30 formed therebetween.

When the super resolution optical disc of the invention is irradiated by recording laser, the metallic oxide thin film is locally and abruptly expanded in volume by virtue of thermal decomposition, and then forms cavities, whereby the metallic oxide thin film is physically decomposed by a high pressure caused by the volume expansion of the metallic oxide. At this time, a metal content in the cavities, that is, the recording marks, is increased depending on the thickness of the metallic thin film.

FIG. 8 is a graphical representation comparing an optical signal from the marks recorded on the super resolution optical discs having the complex mask layer according to the invention and an optical signal from the marks on the conventional super resolution optical discs having the single mask layer. As can be seen from FIG. 8, the optical signal for the marks recorded on the super resolution optical disc having the complex mask layer according to the invention has a higher level than the optical signal for the marks recorded on the super resolution optical disc having the single mask layer, thereby providing a high level reproduction signal through the recording marks on the super resolution optical disc of the invention.

The size of the cavities is controllable by controlling the composition ratio of the metallic oxide or nitride, and/or the thickness of the metallic oxide or nitride, and the metal content in the cavities is controllable by controlling the thickness of the metallic thin film. As such, the size of the cavities and the metal content in the cavities can be independently controlled, thereby increasing the level of the reproduction signal for the recording marks while enhancing the quality of the reproduction signal.

As described above in the description, according to the present invention, there is an advantageous effect of increasing the level of the reproduction signal for the recording marks while enhancing the quality thereof.

It should be understood that the embodiments and the accompanying drawings have been described for illustrative purposes and the present invention is limited only by the following claims. Further, those skilled in the art will appreciate that various modifications, additions and substitutions are allowed without departing from the scope and spirit of the invention as set forth in the accompanying claims.

What is claimed is:

1. A super resolution optical disc, comprising: at least one mask layer; and at least one metallic thin film formed on at least one of upper and lower surface of the mask layer,
wherein the mask layer and the metallic thin film constitute a complex mask layer, and the super resolution optical disc further comprises dielectric layers formed on upper and lower surfaces of the complex mask layer.

2. The optical disc as set forth in claim 1, wherein the at least one mask layer comprises a plurality of mask layers, and the at least one metallic thin film is formed between the mask layers.

3. The optical disc as set forth in claim 1 or 2, wherein the at least one mask layer comprises a metallic compound comprising one of oxygen and nitrogen, and when the mask layer is heated above a predetermined temperature, the mask layer is thermally decomposed into nanosized metal particles and gas.

4. The optical disc as set forth in claim 3, wherein a metallic component contained in the metallic compound and thermally decomposed therefrom is different from that of the metallic thin film.

5. The optical disc as set forth in claim 3, wherein a metallic component contained in the metallic compound and thermally decomposed therefrom is the same as that of the metallic thin film.

6. The optical disc as set forth in claim 1 or 2, wherein the metallic thin film consists of a metallic material capable of being mechanically or chemically deposited.

7. The optical disc as set forth in claim 1, wherein the dielectric layers comprise at least one of $ZnS-SiO_2$, GeN and $SiN_x$.

8. The optical disc as set forth in claim 1, further comprising at least one recording layer formed on one of upper and lower surfaces of the structure comprising the dielectric layers and the complex mask layer formed between the dielectric layers.

9. The optical disc as set forth in claim 8, wherein the at least one recording layer comprises at least one of Ge, Sb, Te, Ag, In, Sn, Zn, Pb, Bi, Ti, Se, S, Al, Ga, Cd and I acting as a phase transformation material.

* * * * *